Inventor:
LUDWIG WEICKHARDT

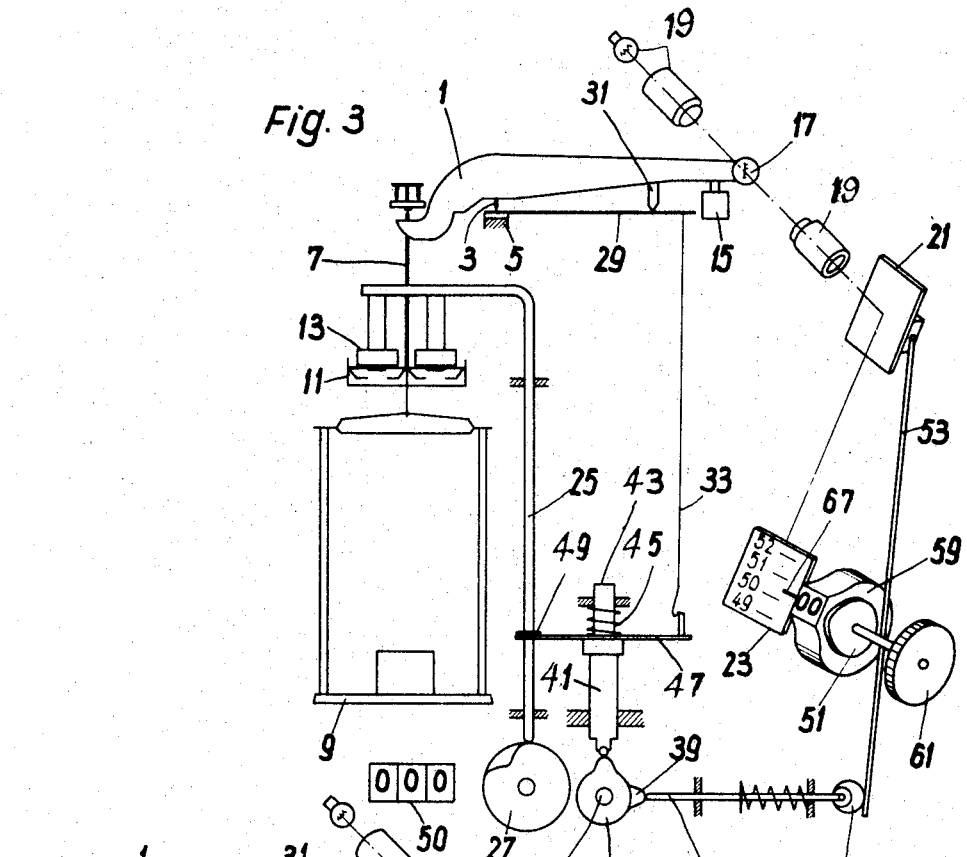
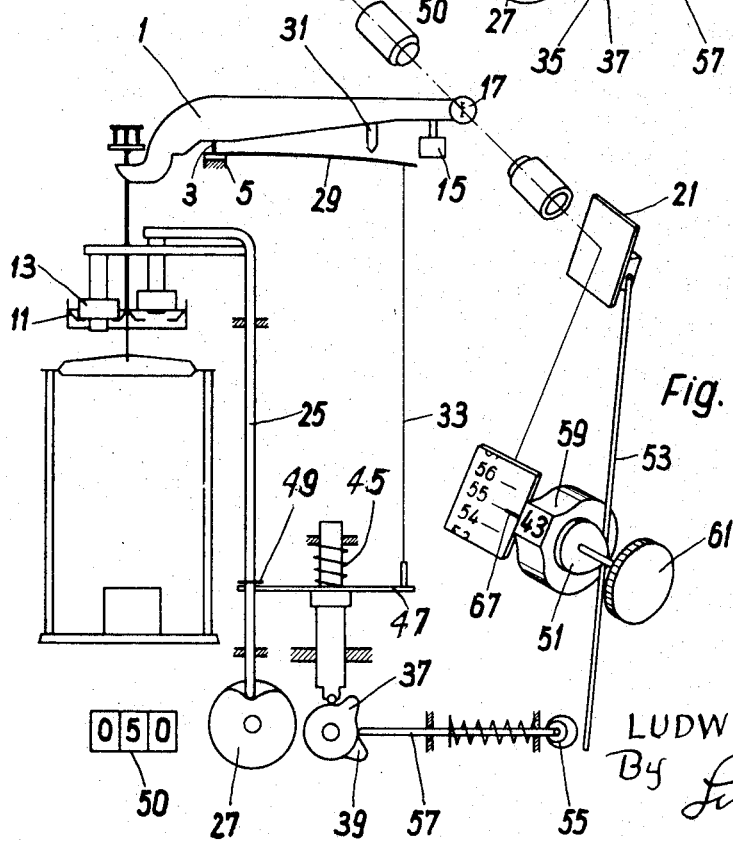

Inventor:
LUDWIG WEICKHARDT

United States Patent Office 3,522,856
Patented Aug. 4, 1970

3,522,856
PRECISION BALANCE WITH PREWEIGHING
Ludwig Weickhardt, Goettingen, Germany, assignor to Firma Sartorius-Werke und vormals Gottinger Prazisionswaagenfabrik G.m.b.H. Aktiengesellschaft, Goettingen, Germany
Continuation of application Ser. No. 465,972, June 22, 1965. This application July 17, 1967, Ser. No. 653,807
Claims priority, application Germany, June 25, 1964,
S 91,686
Int. Cl. G01g 23/14
U.S. Cl. 177—168        7 Claims

ABSTRACT OF THE DISCLOSURE

A substitution type precision balance having a spring adapted to oppose the torque of its counterweight so that preweighing can be carried out, and means for retracting the spring from contact with the balance arm during precision weighing operations. The balance weight selection means is equipped with a stop so that a set of balance weights can be selected but not deposited on the load side of the balance until the stop is released. The same manually operable control means withdraws the spring and releases the selected balance weights. The single optical system for reading the beam position is arranged to make readings of two orders of magnitude of measurement.

CROSS-REFERENCE TO RELATED APPLICATION

This is a continuation of my copending U.S. Pat. application Ser. No. 465,972, filed June 22, 1965, now abandoned, the benefit of the filing date of which is claimed for all subjects matter claimed herein.

BACKGROUND OF THE INVENTION

The present invention relates to substitution type precision balances of the kind incorporating preweighing means, and more particularly to such balances wherein the preweighing means includes a spring acting on the beam during preweighing and arranged to replace the action of the selectable weights on the beam.

SUMMARY OF THE INVENTION

According to a particular aspect of the present invention, the preweighing spring acts to oppose the downward force of the counterweight. This mode of utilizing the preweighing spring provides several advantages over the known ararngement wherein the preweighing spring pulls downward on the counter-poise arm of the balance beam and thereby adds its force to the downward force of the counterweight.

In preweighing with balances incorporating said known arrangement, all of the balance weights must be loaded on the load side of the scale beam, and must not be taken off the load side of the scale beam until the preweighing process is concluded. Otherwise, the weight of the balance weights removed would apparently add to the downward pull on the counter-poise arm exerted by the preweighing spring, resulting in false indication by the balance.

After preweighing has been accomplished on a balance incorporating said known arrangement, the balance must be switched to its precision weighing, or fine weighing, mode of operation. In so doing the weight of the balance weights, or switching weights, loaded upon the load arm must be set in accordance with the preweight determined in the preweighing step. However, as explained immediately above, no balance weights can be removed from the load side of the beam in said known arrangement until after the conclusion of preweighing. It is therefore necessary to remember or write down the preweight read from the balance, and in some instruments to multiply the read weight by a scale factor. The balance weights loaded on the load arm of the balance can be set in accordance with this recorded reading only after the balance has been switched to its precision weighing mode of operation. This necessity for recording the preweight, even when done only in the mind of the operator, complicates the weighing process and introduces a possible source of error in the result.

In order to avoid these disadvantages, balances of the prior art have incorporated mechanisms capable of automatically loading onto the load arm of the balance a quntity of balance weights determined in accordance with the weight determined by preweighing. These mechanisms however, are complex, delicate, and generally very expensive.

To avoid these deficiencies, it is possible according to the teachings of the present invention to make the means which control the selection of the balance weights to be deposited on the load arm of the balance independent of the means which control the depositing of the selected set of balance weights on the load arm. This makes it possible to select the balance weights to be deposited on the load arm while the result of the preweighing is still indicated by the balance. It is then no longed necessary to write down or remember the weight determined by preweighing, and, more than this, a double check can be made to determine whether the balance weight selecting members have been set correctly. Only after the balance weights to be deposited on the load arm have been preselected is the balance switched to its fine weighing mode of operation and the succeeding digits of the sample weight determnied.

In another balance of the prior art, the preweighing spring engages the load arm of the beam, i.e., the end of the beam which carries the load and the balance weights, or switching weights. During preweighing with a device of this type all of the switching weights must be deposited on the load arm so that the beam when unloaded settles at zero balance, and inclines to indicate preweight only after the sample is deposited in the pan on the load arm. The beam in a scale of this type must, therefore, be designed to bear twice the maximum weight which can be measured by the device. That is, it is possible that during the use of such a device a sample may be deposited in the scale pan of weight equal to the weight of the full set of balance weights. This is in contrast to the usual method of operating substitution type balances wherein, in balancing, the scale beam is always loaded with the single weight only, because switching weights are lifted off in accordance with the load.

According to a further aspect of the present invention, the preweighing spring, contrary to the practice discussed in the previous paragraph, acts upon the arm of the scale beam which carries the counterweight, while all of the balance weights are lifted off the load arm of the scale beam during the entire preweighing process. Therefore, in devices according to the invention, the scale beam is loaded only with the sample and the counterweight during preweighing, and is not loaded by any of the balance weights during preweighing.

The zero adjustment of the optical indicating system of prior art precision balances by adjustment of a mirror, for instance, the last mirror of the optical indicating system, is known in the prior art. However, if such prior art optical indicating systems are to be utilized for fine indication in precision weighing, as well as for coarse indication in preweighing, the zero adjusting mirror can be adjusted either for the preweighing range only or for the fine weighing range only, but not for both. To accomplish zero adjustment in both ranges in prior ar optical indicating systems, additional means must be provided.

According to another aspect of the present invention, the deficiency pointed out in the previous paragraph is overcome by an optical system which serves for both fine indication and coarse indication, and possesses at least one mirror, or light ray diverting member, arranged so as to be adjustable by means of two independent adjusting means. One of said adjusting means constitutes part of the preweighing system, while the other adjusting means constitutes part of the fine weighing, or precision weighing, system. In switching from the preweighing range to the fine weighing range, the one adjusting range is automatically disconnected from the mirror and the other adjusting means is engaged therewith.

That is to say, in a device according to this aspect of the present invention, the zero adjustment in the preweighing range can be made by means of the one adjusting member and, independently thereof, the zero adjustment in the fine weighing range may be made by the other adjustment means. In switching from one range to the other range, the driving connection between one of the adjustment means and the mirror is made, and the driving connection between the other adjustment means and the mirror is disconnected, or vice versa. In this way the optical system is automatically switched to the correct zero correction when the other elements of the balance are switched from one measurement range to another.

The independence of the two zero adjusting means is particularly advantageous when it is desired to indicate the two lowest order digits of the weight of the sample being weighed by means of a digital readout device such as a mechanical shaft revolution counter coupled via a suitable gear train to the axis of a cam adapted to deflect the mirror. The term "counter" as used herein means, of course, a mechanical registering device equipped with at least one tens-carry mechanism, and thereby distinguished from a mere register. This lower order digital indicating system operates as follows. The frosted glass reading screen of the balance is equipped with an index mark 67. When fine balance is achieved, with a sample in the weighing pan, the counter is reset to zero by means of knob 61, as shown in FIG. 3 of the appended drawings. Knob 61, which turns the mirror driving cam, is then turned by hand until, due to the corresponding deflection of the last mirror of the optical system 21, the next lower graduation of the scale as reflected on the ground glass screen is brought into line with the index mark. The number then appearing on the counter indicates the two lowest order digits of the weight of the sample in the pan.

According to a further aspect of the present invention, the counter may be in driving connection with the adjusting means associated with the fine weighing range, while independently thereof, the adjusting means associated with the preweighing range "remembers" the zero adjustment for the preweighing range.

It is therefore an object of the present invention to provide a precision balance wherein the measured preweight may be manually transferred to the balance weight, or switching weight, control means before the balance is switched to the precision weighing, or fine weighing, range.

Another object of the present invention is to provide a precision balance of the substitution, or constant-load, type wherein the measured preweight need not be recorded, or remembered, by the operator during switching from the preweighing range to the precision weighing range.

Another object of the present invention is to provide a precision balance of the substitution type where preweighing is carried out with the aid of a preweighing spring, but without loading the load arm of the balance beam with the full set of balance weights.

Another object of the present invention is to provide a precision balance wherein a single optical indicating system is used to indicate both the coarse measurement resulting from the premeasurement and the fine measurement resulting from the precision measuring operation.

Another object of the present invention is to provide a precision balance wherein digital readout means is provided for the two lowest order digits of any measurement.

Other objects of the invention will in part be obvious and will in part appear hereinafter.

The invention accordingly comprises the features of construction, combinations of elements, and arrangements of parts, which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIGS. 3 and 4 show the same balance in preweighing and fine weighing positions, respectively, but equipped with a counter and other means for digital indication of the two lowest order digits of the measuring result;

DESCRIPTION OF THE PREFERRED EMBODIMENTS

Figure 1:
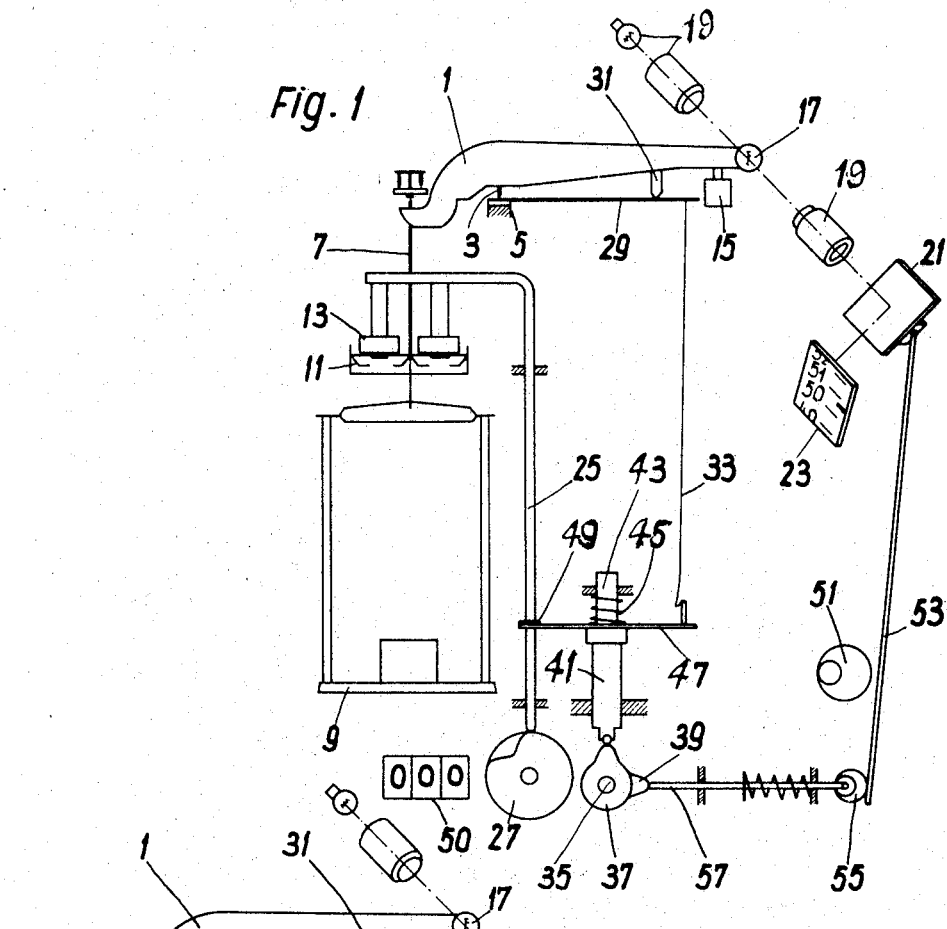
FIGS. 1 and 2 show schematically a substitution type precision balance according to the present invention, in preweighing and fine weighing positions, respectively. In this balance, the lowest order digits must be estimated by eye.
Figure 2:
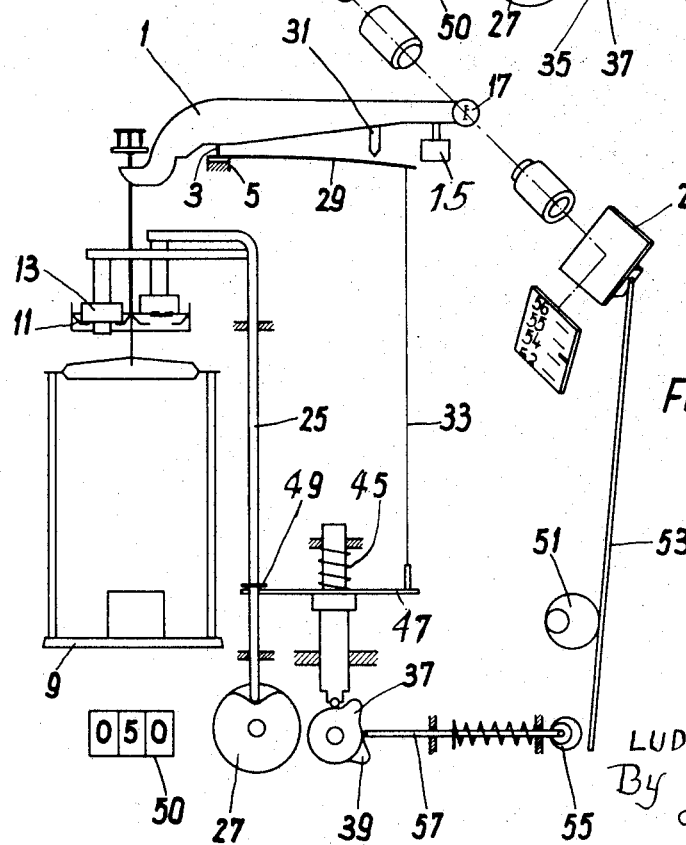

As may be seen in FIGS. 1 and 2, the beam 1 of the precision balance of the invention has a main knife edge 3 which rests on a bearing or fulcrum plate 5 fastened to the frame of the balance. The short arm, or load arm, of the beam carries a pendant 7 to which is attached scale pan 9 and a plurality of receptacles 11 for the balance weights, or switching weights, 13. Attached to the right arm, or counter-poise arm, of the beam are the counterweight 15 and a microscale 17. Microscale 17 traverses the optical path of an optical projecting system 19 in accordance with the tilting of beam 1, and the movement of counterweight 15. In the embodiment of FIGS. 1 and 2, the last mirror 21 of the optical indicating system including optical projecting system 19, which throws an image of microscale 17 on frosted glass reading screen 23, serves for zero adjustment.

The switching rods for the selective lifting of switching weights 13 off their corresponding receptacles 11 are designated as 25, and the cam plates provided for their actuation as 27.

Arrangements whereby selected ones of a set of balance weights may be loaded upon the arm of a balance, or removed therefrom, by the actuation of manual control means remote from the balance have long been known to those having ordinary skill in the art, and are described and shown herein only to the extent necessary to indicate the cooperation of mechanical elements constituting part of the invention therewith.

The preweighing spring is designated by the reference numeral 29.

The balance of the invention may, of course, be equipped with conventional arrester, or carrier, means on which the beam and pendant rest when the scale is not in use, but such arrester, or carrier, constitutes no part of the present invention, and is not illustrated herein.

Preweighing spring 29 is mounted in cantilever fashion, and lies generally below the counter-poise arm of beam 1. An auxiliary knife edge 31 is mounted on the lower face of beam 1 in such a position as to bear upon preweighing spring 29 adjacent its free end when preweighing spring 29 is released to carry out its preweighing function as described hereinbelow. The fixed end of preweighing spring 29 is affixed to the frame of the balance near bearing 5. A chain 33 is affixed to preweighing spring 29 adjacent its free end and depends therefrom. Thus, if a downward pull is exerted on chain 33, the free end of preweighing spring 29 can be withdrawn from contact with knife edge 31 throughout the entire range of motion of beam 1.

The device of the invention is switched between its preweighing and fine weighing modes of operation by means, for instance, of a knob (not shown) which is affixed to the outer end of shaft 35. Shaft 35 is journaled in bearings (not shown) which are affixed to the frame of the balance. Cams 37 and 39 are mounted upon shaft 35 and fixed against rotation with respect thereto. Suitable detents or other conventional means are provided for locking shaft 35, and thus cams 37 and 39, in either one or the other of the positions shown in FIGS. 1 and 2, respectively. The position of cams 37 and 39 shown in FIG. 1 corresponds to the preweighing, or coarse weighing, mode of operation, while the position of cams 37 and 39 as shown in FIG. 2 corresponds to the precision weighing, or fine weighing, mode of operation. A bushing 41 follows cam 37. Bushing 41 is slidably mounted upon a rod 43 which is itself affixed at its upper end to the frame of the balance. A coil spring 45, mounted on rod 43 between the mounting rod 43 and the upper end of bushing 41, constantly urges bushing 41 downwardly into contact with cam 37. A crosspiece 47, provided with an opening through which rod 43 passes, is affixed to the upper end of bushing 41. The lower end of chain 33 is fastened to the right-hand end of crosspiece 47. The left-hand end of crosspiece 47 is provided with a plurality of fingers, or the like, which are adapted to engage a plurality of stops 49. Each one of the switching rods 25 is equipped with a stop 49, each stop being affixed to its corresponding switching rod against longitudinal motion with respect thereto. Each one of the switching rods is, in the well-known manner, mounted in bearings affixed to the frame of the balance, and thus constrained to vertical motion. Each switching rod 25, at its upper limit of motion, holds its corresponding balance weight 13 withdrawn from its corresponding receptacle 11. On the other hand, when any switching rod 25 is at its lower limit of motion its corresponding balance weight 13 is deposited in its corresponding receptacle 11, and thus the weght of that balance weight is loaded on beam 1 via pendant 7.

In the preweighing mode of operation as illustrated in FIG. 1, crosspiece 47 is lifted to its uppermost position by cam 37 acting upon the lower end of bushing 41. Therefore, the fingers or other means at the left-hand end of crosspiece 47, engaging the stops 49, raise all of the switching rods 25 to their uppermost positions, thereby lifting all of the balance weights 13 out of their corresponding receptacles 11. Thus, in the preweighing mode of operation, all of the balance weights are unloaded from beam 1, completely independently of the positions of the selecting cams 27 which would otherwise determine which balance weights 13 were deposited in their corresponding receptacles 11, and which were raised out of their corresponding receptacles 11.

Due to the raised position of the right-hand end of crosspiece 47, chain 33 hangs slack as shown in FIG. 1. Therefore, in the preweighing mode of operation, preweighing spring 29 is in engagement with the auxiliary knife edge 31 attached to the lower edge of beam 1.

Referring now to FIG. 2, which illustrates the precision weighing mode of operation, it can be seen that in carrying out this mode cam 37 is manually rotated into a position wherein bushing 41 is allowed to drop to the smallest diameter of the cam. Consequently, crosspiece 47 also drops, bushing 41 and crosspiece 47 being affixed to each other and both resiliently biased toward cam 37 by spring 45, all as described hereinabove.

As a result of the dropping of crosspiece 47, the stops 49 on switching rods 25 are released. Thus, all of the switching rods 25 which are not then maintained in their uppermost position by their coacting cam members 27 are allowed to drop, depositing their corresponding balance weights 13 in their associated receptacles 11.

As explained hereinabove, the setting of the balance weight control cams 27 was made manually during the preweighing step in accordance with the result of the preweighing as shown on frosted glass screen 23. Thus, after the precision weighing step is begun by the dropping of crosspiece 47, the full set of balance weights less those equal to the rough premeasurement formerly indicated on screen 23 are deposited in their corresponding receptacles 11.

An indicator 50 is provided, of a type well-known in the prior art, which is adapted to digitally indicate the total weight of the set of balance weights not deposited in receptacles 11. Since the setting of cams 27 is not altered in the fine weighing step, indicator 50 continues to indicate the result of the coarse measurement. For instance, in the example illustrated in FIGS. 1 and 2, the preweighing step resulted in an indication on screen 23 that the sample in pan 9 weighs more than 50 grams, but less than 51 grams. As a result of the manual setting of cams 27, when the balance was switched to the precision weighing step all but 50 grams of balance weights 13 were deposited in receptacles 11, and the rough measurement, viz., 50 grams, remained recorded on indicator 50. It will, of course, be evident to those having ordinary skill in the art that the scale factor which makes it possible to use the same microscale 17 and optical systems 19, 21, 23 for both the decimally-related coarse and fine measurements is inherent in the design of the preweighing spring 29 and its manner of coaction with the other parts of the balance. Given the teachings of this specification, however, the design of such a spring 29 and its associated parts is within the scope of one having ordinary skill in the art, and need not be discussed further herein.

As a further result of the downward movement of crosspiece 47, chain 33 becomes taut and pulls the free end of the preweighing spring 29 downwardly and out of contact with auxiliary knife edge 31. This enables the operator to utilize the balance for making the fine measurement in the well-known manner, as though preweighing spring 29 did not exist at all.

In the embodiment of FIGS. 1 and 2, after fine adjustment by the operator in the well-known manner, two decimal places of weight will be read from screen 23, and a third estimated by eye.

Zero adjustment of the optical system for fine weighing is made by means of a cam 51 which tilts final mirror 21 by means of adjustment arm 53. This adjustment is made in the manner well-known to those having ordinary skill in the art, and need not be discussed here. Cam 51 may, for instance, be provided with a screwdriver adjustment accessible exteriorly of the base portion of the balance, the adjustment means being so designed that cam 51 remains set in any position to which it is turned by a screwdriver. This can be accomplished by a spring-loaded friction brake, or by other means well-known to those having ordinary skill in the art.

In contradistinction to the usual zero adjustment devices of the prior art however, arm 53 is merely arranged, by bias springs or otherwise, to rest upon cam 51 unless disengaged therefrom.

A separate cam 55 is adapted to provide zero adjustment in the preweighing range. Cam 55 is mounted on one end of a push rod 57, the push rod being spring biased so that its other end follows cam 39 on shaft 35. Thus, as may be seen by comparison of FIGS. 1 and 2, cam 55 will be thrust into contact with arm 53, disengaging arm 53 from cam 51, during preweighing.

Cam 55, like cam 51, is adapted to be rotated into any position in order to effect a correct zero adjustment, and is maintained in that position by friction or other means well-known to those having ordinary skill in the art.

As may be seen from the above, mirror 21 may be adjusted for proper zero adjustment during preweighing by means of cam 55 when the balance is switched to its preweighing mode, i.e., when push rod 57 is thrust rightwardly by the lobe of cam 39. When the balance is switched to its precision weighing mode, however, the lobe of cam 39 is withdrawn, and a spring loaded push rod 57 retracts cam 55 so far that the position of arm 53 is determined by cam 51, rather than by cam 55. However, cam 55 maintains its orientation with respect to push rod 57, and thus retains the proper zero adjustment for preweighing to which mirror 21 will be restored whenever the balance is switched back to its preweighing mode. Similarly, cam 51 retains the proper zero adjustment for the fine measuring mode, and mirror 21 will automatically be returned to this proper angle of adjustment for the fine measuring mode whenever cam 55 is sufficiently retracted due to switching from the preweighing mode to the fine weighing mode.

Recapitulating, it may be seen that the embodiment of FIGS. 1 and 2 operates as follows. The balance is first switched into its preweighing mode of operation as illustrated in FIG. 1 by manual actuation of cam 37 as described hereinabove. After the sample to be weighed is deposited on pan 9, the approximate weight of the sample will be indicated on ground glass screen 23, i.e., between 50 and 51 grams in the case illustrated herein. Now, the operator, interpreting the reading on screen 23 to indicate that the sample weighs somewhat over 50 grams, manipulates the manual control of cams 27, thereby preselecting a total of 50 grams in balance weights which are not to be deposited in their corresponding receptacles 11 at the time of switching to the fine weighing mode of operation. As a further result of this manual manipulation, indicator 50 now indicates the number 50. The balance is then swtched into its fine weighing mode of operation as illustrated in FIG. 2 by manually rotating cam 37. In this process, all of the receptacles 11 supported by pendant 7 are loaded with their corresponding balance weights, except for those receptacles whose corresponding weights total 50 grams. Frosted glass window 23 now indicates the digits succeeding 50 grams, in the present case a little more than 0.54 gram. The last digits are estimated. Accordingly, the weight of the sample used in the illustration of FIG. 2 is 50.545 grams.

Figure 5:
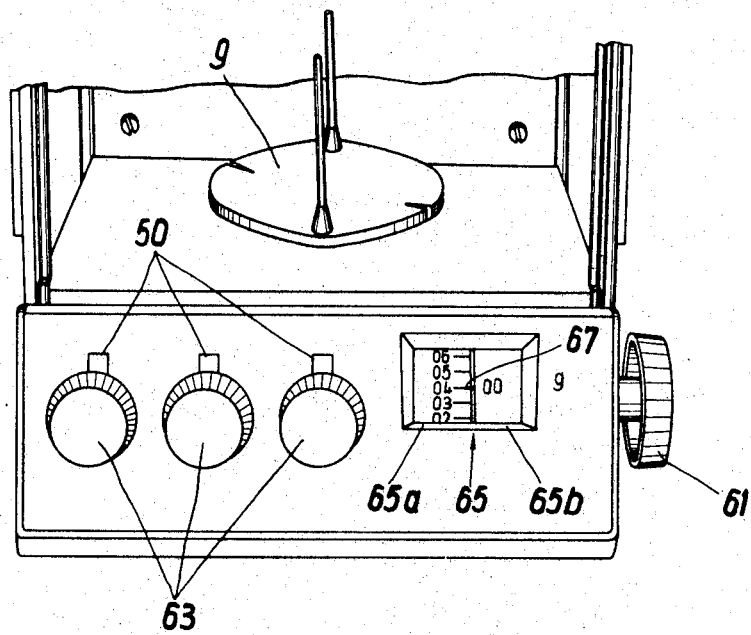
FIG. 5 shows the base portion of a scale according to the present invention which is equipped with a counter in the manner shown in FIGS. 3 and 4.

In the embodiment of FIGS. 3 through 5, a counter 59 is provided for the digital indication of the two lowest order digits of the weight of the sample. This counter is utilized to determine said two lowest order digits in the manner described hereinabove. Cam 51, against which arm 53 bears in the fine weighing mode of operation, is mounted on the shaft of knob 61. As explained in fuller detail hereinabove, manual turning of knob 61 not only turns cam 51, and thus adjusts mirror 21 via arm 53, but also turns the input member of a suitable gear train, and thus causes the indication of counter 59 to change rapidly in response to small angular movements of cam 51. The selection of said gear train, the contour of cam 51, etc. in order to carry out accurate digital interpolation between the scale marks shown on frosted glass screen 23, are all within the scope of one having ordinary skill in the art who is informed by the present disclosure, and need not be further discussed herein.

While FIGS. 3 and 4 illustrate the operation of the second embodiment schematically, FIG. 5 shows the actual arrangement of the setting and reading members of such a scale. The value of the balance weights not loaded upon the load arm when switching to fine weighing are indicated in windows 50. Knobs 63 are used to set this value in their corresponding windows after this value has been determined in the preweighing step. In the left half 65a of a window 65 appears the projected sector of microscale 17, while in the right half 65b there appears the number indicated by counter 59. Knob 61 by which the counter is operated may be seen at the right-hand side of the base of the instrument.

In using the balance of the embodiment of FIGS. 3, 4, and 5, preweighing and setting of the balance weight value behind windows 50 is carried out as described above. After switching to fine weighing, it is then indicated in window 65a that the decimal portion of the weight of the sample is between 0.55 and 0.56 gram. The counter (set to zero in the preweighing step, FIG. 3) is now actuated by means of knob 61, consequently rotating cam 51 and thus deflecting mirror 21 via arm 53. More particularly, knob 61 is manipulated so as to bring the 55 unit graduation into coincidence with the stationary index mark, or zero mark, 67 as shown in FIG. 4. In this condition the counter then indicates the two lowest order digits of the weight of the sample. The result of the entire weighing procedure, as indicated in FIG. 4, is 50.5543 grams.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings shall be interpreted as illustrative only and not in a limiting sense.

What is claimed is:

1. A two mode weighing precision balance comprising: a frame; a balancing beam; a main knife supporting said balancing beam and dividing said balancing beam into a load arm and a counter-poise arm; switching weights selectively attachable to said load arm; means for selectively applying said switching weight to said load arm; a counterweight attached to the end of said counter-poise arm; a spring mounted with its one end in said frame, the other end of said spring supporting said counter-poise arm and controlling said switching means; whereby: the torque about said main knife edge applied to said counter-poise arm of said beam by said spring opposes the torque about said main knife edge applied to said counter-poise arm of said beam by said counterweight.

2. A precision balance, comprising: a beam; a main knife supporting said beam and dividing it into a load arm and a counter-poise arm; switching weights attachable to said load arm; a spring which acts upon said beam in preweighing and is separated therefrom in fine weighing, means for selectively applying said switching weights to said load arm, a counterweight mounted near one end of said beam wherein the torque about said main knife edge applied to said beam by said spring opposes the torque about said main knife edge applied to said beam by said counterweight.

3. A precision balance according to claim 2 including means for loading balance weights on the load arm of said beam, and means for automatically withdrawing all of said balance weights from said beam when said balance is switched to its preweighing mode of operation.

4. A precision balance comprising: a beam; a spring which acts upon said beam in preweighing and is separated therefrom in fine weighing; an optical indicating system including at least one angularly adjustable light ray diverting member for indicating the inclination of said beam during both preweighing and fine weighing; first adjusting and registering means for adjusting said diverting member during fine weighing and registering the fine weighing adjustment of said diverting member during preweighing; second adjusting and registering means for adjusting said diverting member during preweighing and registering the preweighing adjustment of said diverting member during fine weighing; and means for automatically connecting said diverting member with said first adjusting and registering means during fine weighing and with said second adjusting and registering means during preweighing.

5. A precision balance according to claim 4 comprising: manual control means for deviating said diverting member from its fine weighing position of zero adjustment, and counter means coupled to said manual control means for loading balance weights on the load arm of said diverting member, whereby the lowest order digits of a fine measurement may be determined by manipulating said manual control means to bring the next lowest graduation of the scale displayed by said indicating system into alignment with the index mark of said indicating system, and then reading said counter.

6. A precision balance according to claim 4 wherein said beam is suspended on a main knife edge and has a counterweight mounted near one of its ends, and wherein the torque about said main knife edge applied to said beam by said spring opposes the torque about said main knife edge applied to said beam by said counterweight.

7. A precision balance according to claim 6 including means for loading balance weights on the load arm of said beam, and means for automatically withdrawing all of said balance weights from said beam when said balance is switched to its preweighing mode of operation.

References Cited
UNITED STATES PATENTS

| | | | |
|---|---|---|---|
| 2,343,621 | 3/1944 | Williams | 177—178 X |
| 3,026,954 | 3/1962 | Appius | 177—157 X |
| 3,055,444 | 9/1962 | Chyo | 177—191 |
| 3,168,154 | 2/1965 | Chappell et al. | 177—168 X |

RICHARD B. WILKINSON, Primary Examiner

J. H. MILLER, Jr., Assistant Examiner

U.S. Cl. X.R.

177—229